(12) United States Patent
Harada et al.

(10) Patent No.: US 11,841,582 B2
(45) Date of Patent: Dec. 12, 2023

(54) DISPLAY DEVICE

(71) Applicant: Japan Display Inc., Tokyo (JP)

(72) Inventors: Tsutomu Harada, Tokyo (JP); Shigenori Aoki, Tokyo (JP); Koji Yoshida, Tokyo (JP); Masayuki Mifune, Tokyo (JP)

(73) Assignee: Japan Display Inc., Tokyo (JP)

( * ) Notice: Subject to any disclaimer, the term of this patent is extended or adjusted under 35 U.S.C. 154(b) by 303 days.

(21) Appl. No.: 17/144,804

(22) Filed: Jan. 8, 2021

(65) Prior Publication Data

US 2021/0132442 A1 May 6, 2021

Related U.S. Application Data

(63) Continuation of application No. 16/142,926, filed on Sep. 26, 2018, now Pat. No. 10,895,782.

(30) Foreign Application Priority Data

Sep. 27, 2017 (JP) ................................. 2017-186528

(51) Int. Cl.
*G02F 1/13357* (2006.01)
*G02B 27/01* (2006.01)
*G09G 3/32* (2016.01)

(52) U.S. Cl.
CPC ... *G02F 1/133606* (2013.01); *G02B 27/0101* (2013.01); *G02F 1/133603* (2013.01); *G02B 2027/0121* (2013.01); *G02F 1/133605* (2013.01); *G09G 3/32* (2013.01); *G09G 2320/066* (2013.01)

(58) Field of Classification Search
CPC ......... G02F 1/133606; G02F 1/133603; G02F 1/133605; G02B 27/0101; G02B 2027/0121; G09G 3/32; G09G 2320/066
USPC ......................................... 359/618, 629, 630
See application file for complete search history.

(56) References Cited

U.S. PATENT DOCUMENTS

| | | |
|---|---|---|
| 5,459,645 A | 10/1995 | Sattler et al. |
| 8,743,156 B2 | 6/2014 | Higashi et al. |
| 2006/0007553 A1 | 1/2006 | Bogner et al. |
| 2007/0064174 A1 | 3/2007 | Kitamura et al. |
| 2011/0051029 A1 | 3/2011 | Okumura |

(Continued)

FOREIGN PATENT DOCUMENTS

| | | |
|---|---|---|
| JP | 2006-501503 | 1/2006 |
| JP | 2007065011 A | 3/2007 |

(Continued)

OTHER PUBLICATIONS

Japanese Office Action dated Nov. 2, 2021 in corresponding Japanese Application No. 2017-186528.

(Continued)

*Primary Examiner* — Tuyen Tra
(74) *Attorney, Agent, or Firm* — K&L Gates LLP

(57) ABSTRACT

A display device is provided and including a backlight device including a plurality of light sources; a display panel disposed to oppose the backlight device and incline with respect to a direction perpendicular to an optical axis of the backlight device; a first diffusion plate between the display panel and the backlight device; and a second diffusion plate arranged at a predetermined angle with respect to the first diffusion plate.

14 Claims, 4 Drawing Sheets

(56) References Cited

U.S. PATENT DOCUMENTS

| | | |
|---|---|---|
| 2017/0276936 A1* | 9/2017 | Shihaku ............ G02B 27/0101 |
| 2017/0299922 A1 | 10/2017 | Matsuura et al. |
| 2017/0329181 A1 | 11/2017 | Pierre |
| 2017/0337885 A1 | 11/2017 | Aoki et al. |
| 2018/0052322 A1 | 2/2018 | Kubota |
| 2020/0201043 A1* | 6/2020 | Sugiyama .......... G02B 27/0149 |

FOREIGN PATENT DOCUMENTS

| | | |
|---|---|---|
| JP | 2010-055999 | 3/2010 |
| JP | 2016-045244 | 4/2016 |
| JP | 2016-065907 | 4/2016 |
| JP | 2017207624 A | 11/2017 |
| WO | 2016083763 | 6/2016 |
| WO | 2016136827 | 7/2017 |

OTHER PUBLICATIONS

Japanese Office Action dated Mar. 9, 2021 in corresponding Japanese Application No. 2017-186528.
Japanese Office Action dated May 25, 2021 in corresponding Japanese Application No. 2017-186528.

\* cited by examiner

DISPLAY DEVICE

CROSS-REFERENCE TO RELATED APPLICATIONS

This application is a continuation of U.S. patent application Ser. No. 16/142,926 filed on Sep. 26, 2018, which is based upon and claims the benefit of priority from Japanese Patent Application No. 2017-186528, filed Sep. 27, 2017, the entire contents of which are incorporated herein by reference.

FIELD

Embodiments described herein relate generally to a display device and a head-up display device.

BACKGROUND

In recent years, head-up displays (HUDs), which reflects images on a projection surface such as a windshield of a vehicle to display information in the visual field of the driver, are becoming widespread. The HUD reproduces virtual images in a place about 4 meters-ahead of the windshield, for the driver to be able to check a course guide, emergency information and the like without greatly moving the line of vision, thereby contributing to safely.

Usually, HUDs comprise a liquid crystal panel and an illumination device (backlight device) which irradiates light onto the liquid crystal panel. Images formed on the liquid crystal panel are illuminated and transmitted by the light of the illumination device, and are projected on the windshield to be reflected by the windshield, to form virtual images. In recent years, display devices with less black floating (mis-adjusted black level), high contrast and low power consumption are being developed with use of an illumination device which can drive with a local dimming drive.

SUMMARY

The present application generally relates to a display device and a head-up display device.

According to an embodiment, a display device is provided. The display device includes a backlight device comprising a plurality of light sources; a display panel disposed to oppose the backlight device and incline with respect to a direction perpendicular to an optical axis of the backlight device; and a diffusion plate between the display panel and the backlight device.

According to another embodiment, a head-up display device is provided. The head-up display device includes a backlight device including a plurality of light sources; a display panel disposed to oppose the backlight device and incline with respect to a direction perpendicular to an optical axis of the backlight device; and a diffusion plate between the display panel and the backlight device; and a projection surface on which a display image of the display panel is projected.

DETAILED DESCRIPTION

Figure 1:
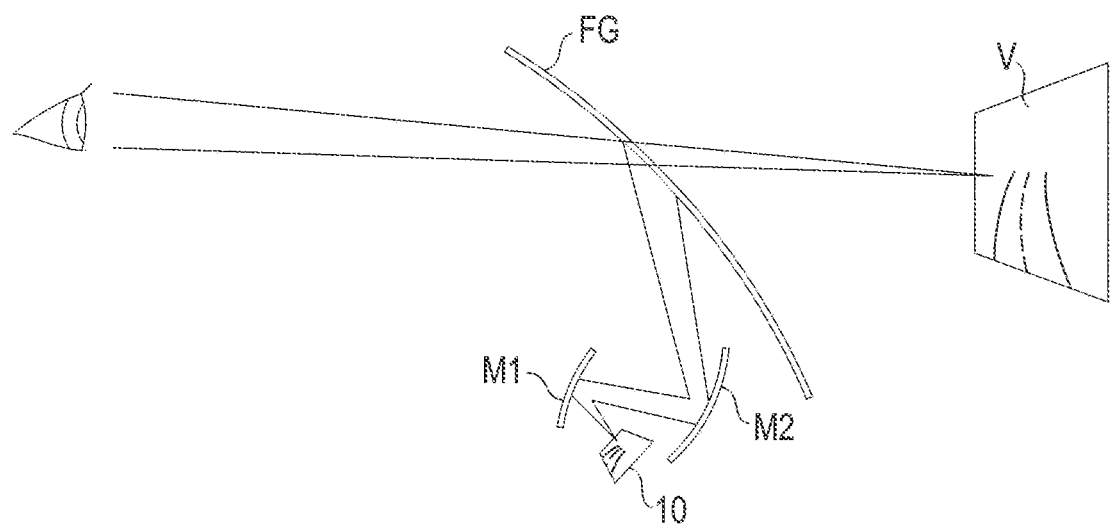
FIG. 1 is a diagram schematically showing a head-up display which comprises a display device according to a first embodiment.

Various embodiments will be described hereinafter with reference to the accompanying drawings. In general, according to one embodiment, a display device comprises a backlight device comprising a plurality of light sources, a display panel disposed to oppose the backlight device and incline with respect to a direction perpendicular to an optical axis of the backlight device and a diffusion plate provided between the display panel and the backlight device.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

When using an HUD under outdoor environment, it is necessary to take into consideration the influence of return light by external light. For example, the liquid crystal panel is inclined to move the return light out of the optical axis, thereby avoiding the return light from reaching the observer's eyes.

In an HUD employing an illumination device which is driven with a local dimming control, the luminance distribution and the display image need to correspond to each other for every block of the illumination device.

FIG. 1 is a diagram schematically showing a head-up display (head-up display device or HUD) which comprises a display device according to a first embodiment. The HUD comprises a liquid crystal display device 10 as a display device for projecting images. The HUD comprises a plurality of, for example, two concave mirrors M1 and M2. A projection image output from the liquid crystal display 10 is reflected and condensed by the concave mirrors M1 and M2, and projected on, for example, an inner surface of a windshield FG of a vehicle as a projection surface. The projected image is reflected towards a driver's side by the windshield FG, to forms a virtual image V several meters ahead of the windshield FG.

Note that the mirrors, which are a part of the HUD, are not limited to a concave type, but may be selected from other optical members such as half mirrors and fresnel mirrors. Moreover, the structure is not limited to a type in which images are directly projected on the windshield FG, but a transparent reflector (projection surface) may be installed in front of the driver to project images on the reflector.

Figure 2:
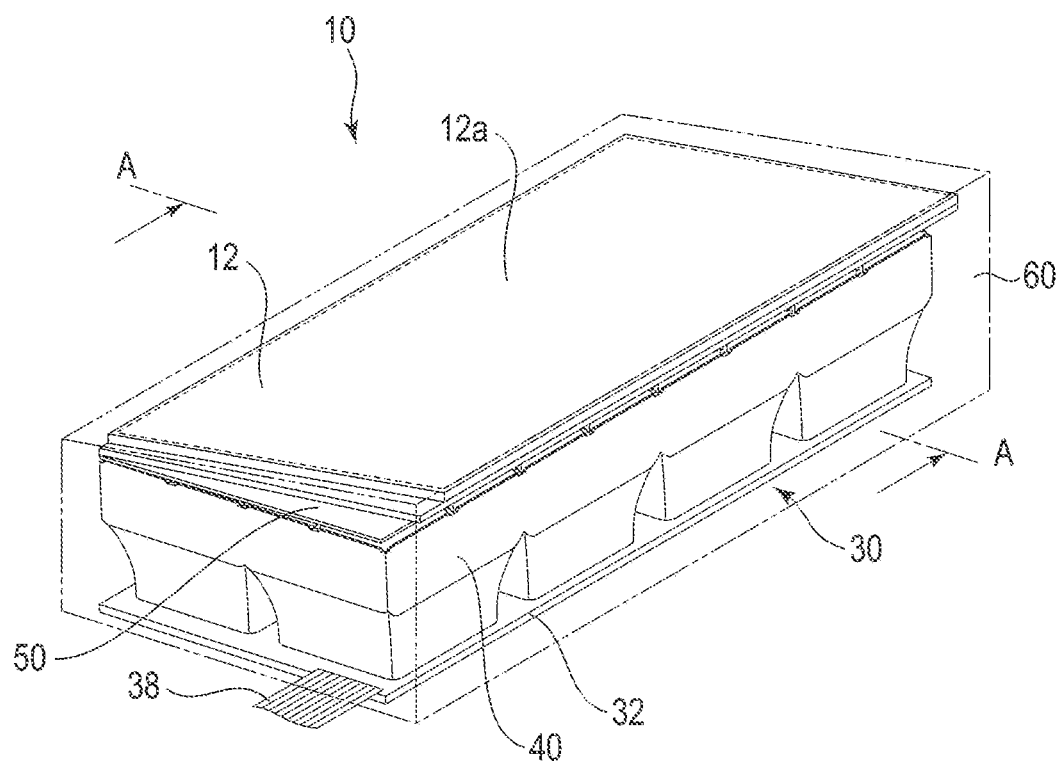
FIG. 2 is a perspective view of the display device.

Next, the liquid crystal display 10 will be described in detail. FIG. 2 is a perspective view of a liquid crystal display device, and FIG. 3 is an exploded perspective view of the liquid crystal display device.

Figure 3:
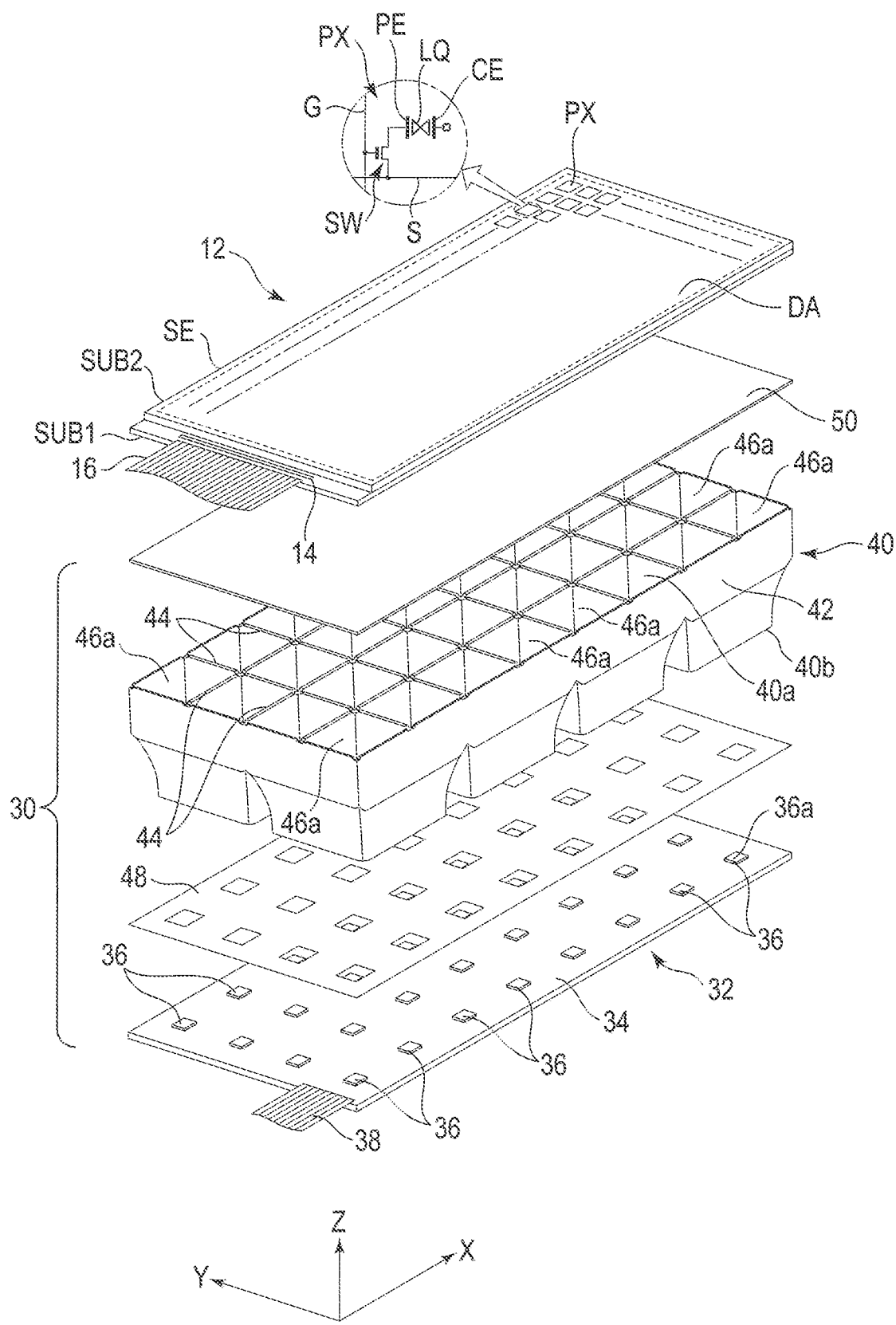
FIG. 3 is an exploded perspective view of the display device.

As shown in FIGS. 2 and 3, the liquid crystal display device 10 comprise an active-matrix type liquid crystal display panel 12, an illumination device (backlight device) 30 provided to oppose a rear surface of the liquid crystal display panel 12, a diffusion plate 50 provided between the liquid crystal display panel 12 and the backlight device 30, and an outer case 60 accommodating the liquid crystal display panel 12, the backlight device 30 and the diffusion plate 50 while exposing a display surface 12a of the liquid crystal display panel 12. The backlight device 30 applies light onto the rear surface of the liquid crystal display panel 12 via the diffusion plate 50 to illuminate the liquid crystal display panel 12. As will be described later, the backlight device 30 is configured to execute local dimming drive which controls the luminance distribution in accordance with the display image by turning on a plurality of light sources simultaneously or individually.

The liquid crystal display panel 12 comprises a rectangular first substrate SUB1, a rectangular second substrate SUB2 opposed to the first substrate SUB1, and a liquid crystal layer LQ held between the first substrate SUB1 and the second substrate SUB2. The first substrate SUB1 and the second substrate SUB2 are, for example, insulating substrates such as of glass or resin. The first substrate SUB1 and the second substrate SUB2 are attached together by a frame-shaped sealing member SE with a predetermined cell gap formed therebetween. The liquid crystal LQ is held in an inner area surrounded by the sealing member SE in the cell gap.

In the region on the inner side surrounded by the sealing member SE in plan view, (which is defined as a state of viewing a central portion of the display surface of the liquid crystal display panel in a direction perpendicular to the display surface), a display area (active area) DA is provided to display images. The liquid crystal display panel 12 includes a plurality of pixels PX arrayed in a matrix in the display area DA. As schematically shown in FIG. 3, the first substrate SUB1 comprises, in the display area DA, gate lines G extending in a first direction, source lines S extending in a second direction which crosses the first direction, switching elements SW electrically connected with the gate lines G and the source lines S in the respective pixels PX, pixel electrodes PE connected respectively to the switching elements SW, and the like. Common electrodes CE of common potential are disposed in the first substrate SUB1 or the second substrate SUB2 so as to oppose the pixel electrodes PE, respectively.

In the example illustrated, a short-side end portion of the first substrate SUB1 projects outwards from the corresponding short side of the second substrate SUB2, and a drive IC 14 as a driver element is mounted on the end portion. A flexible printed circuit (FPC) 23 is joined to the end portion of the first substrate SUB1 and extends outward from the liquid crystal panel 12. Wiring lines of the FPC 16 are connected to the drive IC 14 via wiring lines on the first substrate SUB1. The drive IC 14 supplies drive signals to the pixels PX based on video signals and scanning signals transmitted via the FPC 16 from a controller (not shown).

The liquid crystal panel 12 has a transmissive display function of displaying images by selectively transmitting light emitted from the illumination device backlight device 30 to the display area DA. The liquid crystal display panel 12 may be configured mainly to be provided for the lateral electric field mode which mainly utilizes an electric field substantially parallel to the main surface of the substrate, or for the vertical electric field mode which mainly utilizes an electric field substantially perpendicular to the main surface of the substrate.

Next, a configuration example of the backlight device 30 will be described in detail. As shown in FIGS. 2 and 3, the backlight device 30 comprises a light source unit (light source portion) 32 including a plurality of light sources 36, and a reflector 40 provided between the light source unit 32 and the liquid crystal display panel 12, so as to function as a light guide. The reflector 40 projects the light emitted from the light sources 36 on the liquid crystal display panel 12 by reflecting the light while imparting directivity thereto. Note that in FIG. 3, a longitudinal direction of each of the liquid crystal display panel 12 and the backlight device 30 is defined as an X-axis direction, a width direction is defined as a Y-axis direction and a height direction is defined as a Z-axis direction.

The light source unit 32 includes a rectangular circuit substrate 34 and a plurality of light sources, for example, light-emitting diodes (LEDs) 36, mounted on the circuit substrate 34. The circuit substrate 34 has substantially the same dimensions (length and width) as those of the liquid crystal display panel 12. For example, thirty two pieces of LEDs 36 are mounted on the circuit substrate 34 and arranged in a matrix with four columns and eight rows. Each of the LEDs 36 can be formed in various forms such as circular, rectangular and elliptical. For example, each of the LEDs 36 is formed into a rectangular shape. An upper surface of each LED 36 forms a light-emitting surface 36a, which comprises an emission center at its center thereof. The LEDs 36 are arranged so that a side of each is aligned with a corresponding side of another LED. Note that the number of LEDs 36 installed and the arrangement thereof are not limited to those of the example provided above, but may be variously changed in accordance with the dimensions and shape of the liquid crystal display panel 12.

The circuit substrate 34 is connected to the controller (not shown) via the FPC 38. The LEDs 36 are turned on/off independently by the controller. That is, all the LEDs 36 can be turned on simultaneously, or some of the LEDs can be turned on for every block according to the display image for local dimming drive.

As shown in FIG. 3, the reflector 40 comprises a rectangular frame-shaped outer wall 42 having a size substantially equal to that of the liquid crystal display panel 12, and a plurality of partition walls (side walls) 44 arranged to cross each other in a grid on an inner side surrounded by the outer wall 42. The reflector 40 is integrally molded from, for example, a white synthetic resin such as polyethylene terephthalate. An inner surface of the outer wall 42 and both surfaces of each partition wall 44 each form a reflective surface. The reflector 40 comprises an upper surface serving as an emission surface 40a and a bottom surface serving as an incidence surface 40b. The emission surface 40a has a rectangular shape with substantially the same size as that of the liquid crystal display panel 12.

A plurality of emission openings 46a defined by the outer wall 42 and the partition walls 44 are made in the emission surface 40a. For example, each emission openings 46a is formed into a rectangular or square shape with four sides. The emission openings 46a are arranged to be adjacent to each other in the longitudinal direction (X-axis direction) and the width direction (Y-axis direction) of the emission surface 40a. In this embodiment, in accordance with the number of LEDs 36, thirty two emission openings 46a are arranged in four columns and eight rows.

Similarly, a plurality of incidence openings (illustration is omitted) defined by the outer wall 42 and the partition walls 44 are made in the incidence surface 40*b*. In accordance with the number of LEDs 36, thirty two incidence openings are provided to be arranged in four columns and eight rows. Moreover, each of the incidence openings is formed in dimensions sufficiently smaller than those of the emission openings 46*a*, for example, ½ or less in dimensions. Each incidence opening is provided at a coaxial position with the corresponding emission opening 46*a*.

The reflector 40 is placed on the circuit substrate 34 via an elastic sheet or a cushion sheet 48. The reflector 40 is provided so that the incidence surface 40*b* is placed on the cushion sheet 48. The reflector 40 is placed on the cushion sheet 48 so that a central axis of each emission opening 46*a* is located coaxial with the optical axis of the corresponding LED 36. Thus, the LEDs 36 are located respectively in the incidence openings 46*b* of the reflector 40. Light emitted from the LEDs 36 when turned on is repeatedly reflected by the reflective surfaces of the reflector 40 and then emitted from the emission surface 40*a* via the emission openings 46*a*.

Figure 4:
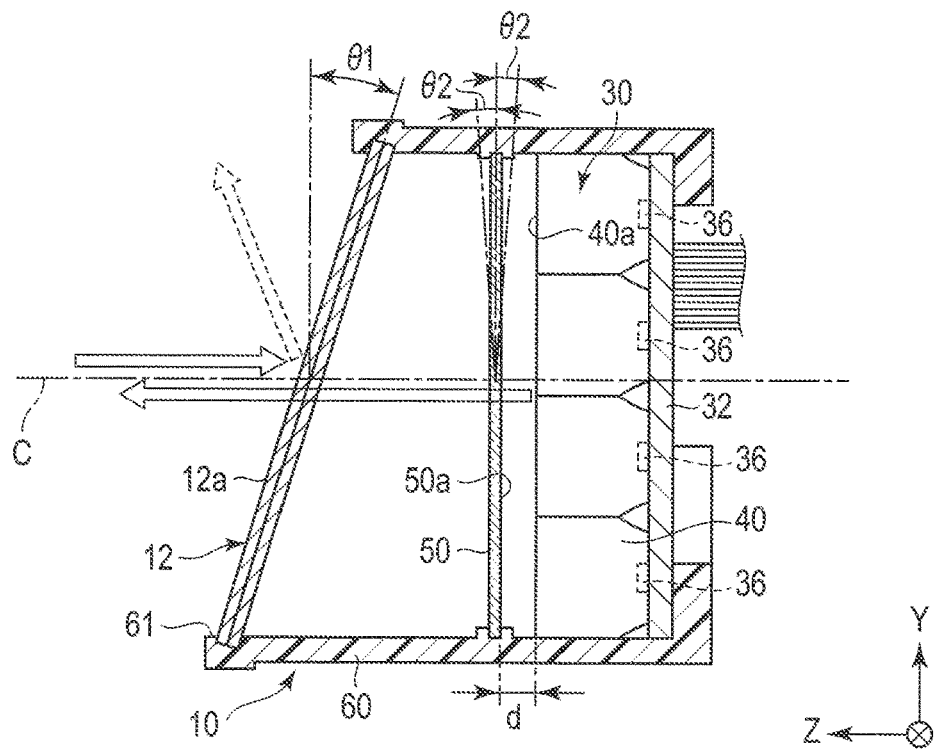
FIG. 4 is a cross-sectional view of the display device taken along line A-A of FIG. 2.

FIG. 4 is a cross-sectional view showing the liquid crystal display device taken along line A-A of FIG. 2. As shown in the figure, the backlight device 30 and the liquid crystal display panel 12, configured as described are disposed in the outer case 60. The outer case 60 is formed in a rectangular cylinder with an opening (display window) 61 at an axial end thereof. The backlight device 30 is disposed in the outer case 60 with the emission surface 40*a* thereof facing an opening 61 side. The liquid crystal display panel 12 is disposed to oppose the emission surface 40*a* of the backlight device 30, and also to be near the opening 61. An entire display surface 12*a* opposes the opening 61 and is exposed to outside of the outer case 60 through the opening 61. In the embodiment, the liquid crystal display panel 12 is inclined at an inclination angle θ1 with respect to a direction perpendicular to an optical axis C of the backlight device 30, (which is, in this embodiment, an optical axis normally crosses the emission surface 40*a* of the reflector 40). The inclination angle θ1 is, for example, 1 to 30 degrees, preferably, 10 to degrees.

The diffusion plate 50 is formed into a rectangular shape having a size substantially equal to that of the emission surface 40*a* of the backlight device 30. The diffusion plate 50 is disposed between the backlight device 30 and the liquid crystal display panel 12 in the outer case 60 and opposes the entire emission surface 40*a* as well as the entire rear surface of the liquid crystal display panel 12. In this embodiment, the diffusion plate 50 is placed perpendicular to the optical axis C, that is, a direction normally crossing the optical axis C, and is located substantially parallel to the emission surface 40*a*. The diffusion plate 50 is displaced to a backlight device 30 side with respect to a middle position between the liquid crystal display panel 12 and the backlight device 30 on the central axis of the liquid crystal display panel 12. A distance between the diffusion plate 50 and the emission surface 40*a* is set to, for example, about to 10 mm. Note that, of the surfaces of the diffusion plate 50, at least the surface 50*a* on the backlight device 30 side is formed glossy.

In this embodiment, the diffusion plate 50 is disposed perpendicular to the optical axis C, but the arrangement is not limited to this. It may be arranged to incline by an inclination angle θ2 with respect to a direction perpendicular to the optical axis C. The inclination angle θ2 is set smaller than the inclination angle θ1 of the liquid crystal display panel 12. The inclination angle θ2 can be set to, for example, 0±10 degrees (−10 to +10 degrees).

According to the display device 10 and HUD, configured as described above, illumination light is applied from the backlight device 30 onto the liquid crystal display panel 12 while displaying a desired image on the liquid crystal display panel 12, and thus a projection image is output from the display surface 12*a* of the liquid crystal display panel 12. The output projection image is reflected and condensed by the concave mirrors M1 and M2, and projected on the inner surface of the windshield FG which functions as a projection surface. The projected image is reflected to a driver's side by the windshield FG, thereby forming a virtual image V several meters ahead of the windshield FG.

When emitting illumination light, the LEDs 36 are driven by the local dimming manner, in which, for example, those LEDs 36 opposing a black display area are turned off while only those opposing the image display area are on. Thus, it is possible to project high-contrast images with less black floating (misadjusted black level).

As shown in FIG. 4, when the liquid crystal display panel 12 is disposed to incline, external light incident on the liquid crystal display panel 12 is reflected in a direction inclined with respect to the optical axis C (indicated by an arrow of dashed line). Therefore, the reflected external light does not reach the observer's eyes. Moreover, when the diffusion plate 50 is provided between the liquid crystal display panel 12 and the backlight device 30, the illumination light emitted from the backlight device 30 once forms an image on the diffusion plate 50. And the illumination light is viewed through the liquid crystal display panel from outside in the optical axis C. With this structure, when the light is viewed from a sufficiently distant position on the optical axis C, the luminance distribution of the illumination light becomes substantially equal to the luminance distribution of the case where the liquid crystal display panel 12 is arranged in parallel to the light emitting surface of the backlight device 30 (when arranged vertical to the optical axis). Thus, even if the backlight device 30 is driven in the local dimming control, the displacement between the luminance distribution of the illumination light and the display image can be suppressed, making it possible to realize even a clearer image display.

As described above, according to the first embodiment, a display device and head-up display free from glare by reflected external light and with improved display quality can be provided.

Next, display devices according to another embodiment and modifications will be described. In the other embodiment and modifications provided below, the same referential numerals are given to the same parts as in the first embodiment described above, the detailed explanations therefor is omitted or simplified. Difference parts from those of the first embodiment will be mainly described in detail.

Second Embodiment

Figure 5:
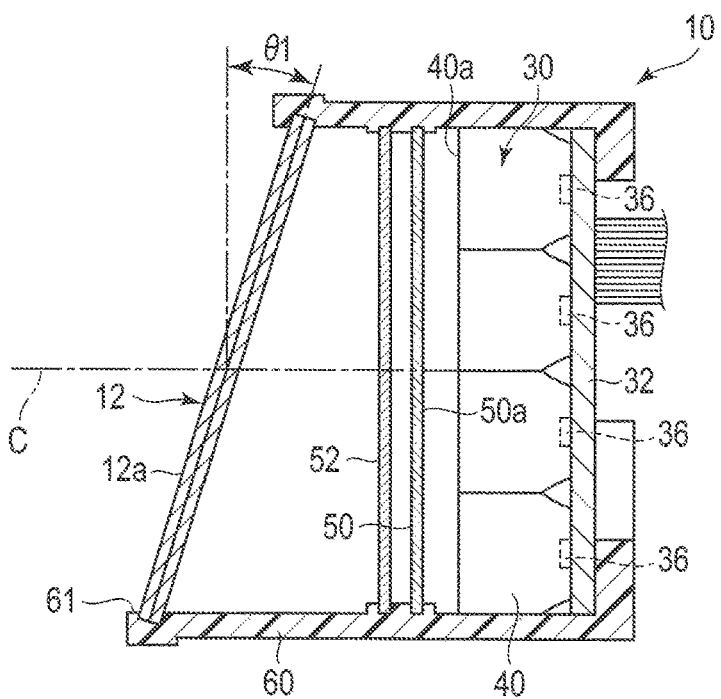
FIG. 5 is a cross-sectional view of a display device according to a second embodiment.

FIG. 5 is a cross-sectional view of a display device according to a second embodiment. As shown in FIG. 5, a display device 10 of the second embodiment comprises a plurality of diffusion plates. Here, the display device 10 comprises a diffusion plate (first diffusion plate) 50 such as that described above and a second diffusion plate 52. The second diffusion plate 52 is formed in the size substantially equal to that of the diffusion plate 50. The second diffusion plate 52 is provided between the diffusion plate 50 and the liquid crystal display panel 12 and is arranged parallel to the diffusion plate 50. In other words, the second diffusion plate 52 is arranged perpendicular to the optical axis C. The second diffusion plate 52 opposes the diffusion plate 50 with a predetermined gap therebetween. The diffusion plate 50 and the second diffusion plate 52 may be arranged at positions near the emission surface 40a with regard to the middle position between the emission surface 40a of the reflector 40 and the liquid crystal display panel 12 on the central axis of the liquid crystal display panel 12. The other structures of the display device 10 are the same as those of the display device of the first embodiment.

According to the display device of the second embodiment configured as above, an advantageous effect similar to that of the first embodiment described above can be obtained. Moreover, it becomes possible to obtain further uniform image display by providing a plurality of diffusion plates.

First Modification

Figure 6:
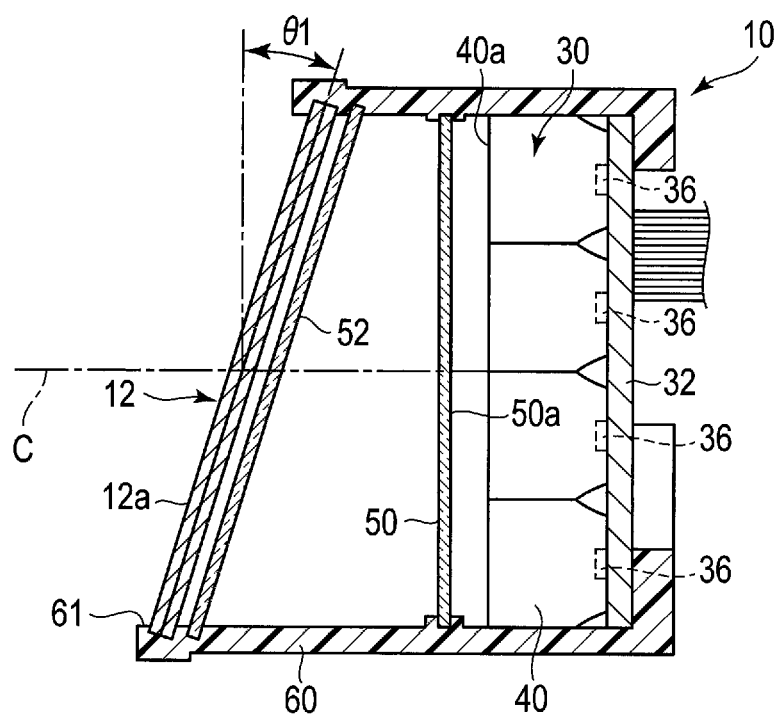
FIG. 6 is a cross-sectional view of a display device according to a first modification.

FIG. 6 is a cross sectional view of a display device according to a first modification of the second embodiment. According to the first modification, the second diffusion plate 52 is arranged to incline with respect to the first diffusion plate 50. Here, the second diffusion plate 52 is opposed to the liquid crystal display panel 12 in parallel thereto. The second diffusion plate 52 is located between the diffusion plate 50 and the liquid crystal display panel 12 and inclined at an inclination angle θ1 with respect to a direction perpendicular to the optical axis C as in the case of the liquid crystal display panel 12. The diffusion plate 50 is arranged at a position near the emission surface 40a with regard to the middle position between the emission surface 40a of the reflector 40 and the liquid crystal display panel 12 on the central axis of the liquid crystal display panel 12, whereas the second diffusion plate 52 is arranged at a position near the liquid crystal display panel 12 with regard to the middle position. Even when the second diffusion plate 52 is arranged as described above, an advantageous effect similar to that of the second embodiment described above can be obtained.

Second Modification

In the first embodiment, the second embodiment and the first modification described above, the outer case 60 may be configured to support the liquid crystal display panel 12 at a variable inclination angle. For example, a plurality of trench portions to fix the liquid crystal display panel 12 may be formed in the outer case 60, and a trench portion into which the liquid crystal display panel 12 is fit may be selected according to the design of the head-up display.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Based on the structures which have been described in the above-described embodiment and variations, a person having ordinary skill in the art may achieve structures with arbitral design changes; however, as long as they fall within the scope and spirit of the present invention, such structures are encompassed by the scope of the present invention. For example, the outer shape and inner shape of the structural members of the liquid crystal panel and the backlight unit are not limited to rectangular, but one or both of the outer shape and inner shape may be in some other shape, for example, polygonal, circular, elliptical or a combination of any of these. The materials of the structural members of the liquid crystal panel and the backlight unit are not limited to those of the examples provided above, but may be selected from various options.

Furthermore, regarding the present embodiments, any advantage and effect those will be obvious from the description of the specification or arbitrarily conceived by a skilled person are naturally considered achievable by the present invention.

What is claimed is:

1. A display device comprising:
    a backlight device comprising a plurality of light sources;
    a display panel disposed to oppose the backlight device and incline with respect to a direction perpendicular to an optical axis of the backlight device;
    a first diffusion plate between the display panel and the backlight device, opposed to the display panel and the backlight device, the first diffusion plate being inclined by −10 to +10 degrees with respect to a direction perpendicular to the optical axis of the backlight device; and
    a second diffusion plate disposed to oppose the first diffusion plate and incline with respect to the first diffusion plate at an angle less than 90 degrees.

2. The display device according to claim 1, wherein the first diffusion plate is arranged in substantially parallel with the backlight device.

3. The display device according to claim 1, wherein the first diffusion plate is provided adjacent to a backlight device side with respect to a middle position between the display panel and the backlight device on a central axis of the display panel.

4. The display device according to claim 1, wherein an inclination angle of the display panel is 1 to 30 degrees.

5. The display device according to claim 4, wherein the first diffusion plate is provided substantially perpendicular to the optical axis of the backlight device.

6. The display device of claim 1, wherein the first diffusion plate comprises a glossy surface which opposes the display panel.

7. The display device of claim 1, wherein the backlight device is configured to turn on the plurality of light sources individually and control a lighting portion according to a display image.

8. The display device of claim 1, wherein the second diffusion plate is provided between the first diffusion plate and the display panel.

9. A head-up display device comprising:
    a backlight device comprising:
        a plurality of light sources;
        a display panel disposed to oppose the backlight device and incline with respect to a direction perpendicular to an optical axis of the backlight device;
        a first diffusion plate between the display panel and the backlight device, opposed to the display panel and the backlight device, the first diffusion plate being inclined by −10 to +10 degrees with respect to a direction perpendicular to the optical axis of the backlight device;

a second diffusion plate disposed to oppose the first diffusion plate and incline with respect to the first diffusion plate at an angle less than 90 degrees; and a projection surface on which a display image of the display panel is projected.

10. The head-up display device of claim 9, wherein the first diffusion plate is provided adjacent to a backlight device side with respect to a middle position between the display panel and the backlight device on a central axis of the display panel.

11. The head-up display device of claim 9, wherein an inclination angle of the display panel is 1 to 30 degrees.

12. The head-up display device of claim 9, wherein the first diffusion plate is provided substantially perpendicular to the optical axis of the backlight device.

13. The head-up display device of claim 9, wherein a surface of the diffusion plate, which opposes the display panel is a glossy surface.

14. The head-up display device of claim 9, wherein the backlight device is configured to turn on the plurality of light sources individually and control a lighting portion according to a display image.

* * * * *